UNITED STATES PATENT OFFICE.

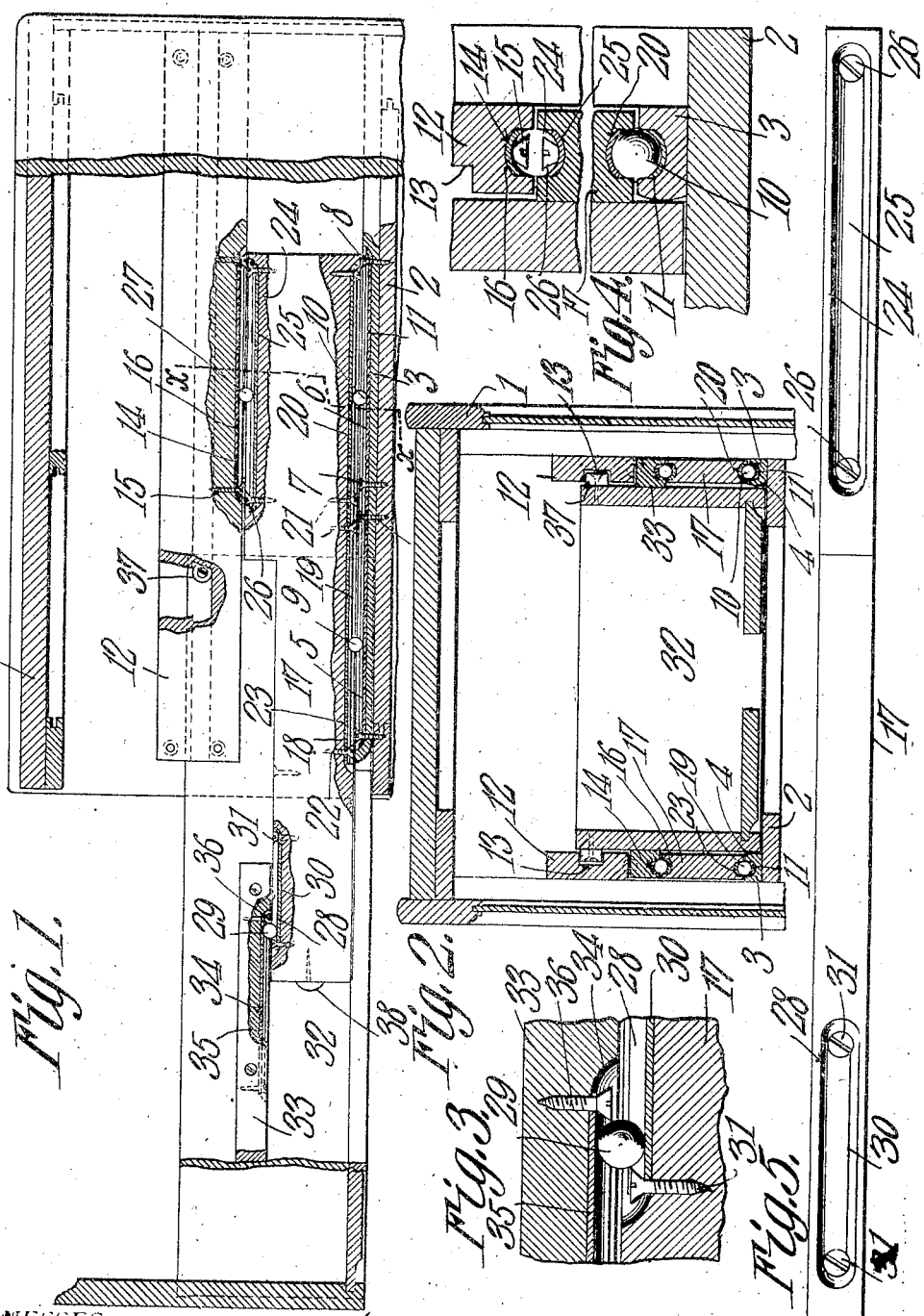

GEORGE R. ROSS, OF MUSKEGON, MICHIGAN.

DRAWER-GUIDE.

No. 879,982.      Specification of Letters Patent.      Patented Feb. 25, 1908.

Application filed July 12, 1907. Serial No. 383,487.

*To all whom it may concern:*

Be it known that I, GEORGE R. ROSS, a citizen of the United States, residing at Muskegon, in the county of Muskegon and State of Michigan, have invented a new and useful Drawer-Guide, of which the following is a specification.

This invention relates to furniture and more particularly to drawers and guides therefor.

The object of the invention is to provide anti-friction devices of a simple, durable, and efficient character which are particularly designed for use in connection with drawers having extension slides such as are used in connection with card index systems and the like.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a longitudinal section through a drawer embodying the present improvements, portions of the slides and guides being broken away. Fig. 2 is a transverse section through the parts shown in Fig. 1. Fig. 3 is an enlarged section through the lapping ends of races within the extension and auxiliary slides of the drawer. Fig. 4 is an enlarged section on line x—x, Fig. 1. Fig. 5 is a plan view of one of the extension slides.

Referring to the figures by characters of reference, 1 designates the housing of the drawer having a bottom or division line 2 on which are arranged supporting tracks 3, the inner or adjoining faces of which are preferably rounded as shown at 4. The upper face of each of these tracks is grooved longitudinally to form races 5 and 6 separated preferably by means of screws 7 which extend into the bottom of the groove adjacent the center thereof and have their heads below or flush with the upper surface of the track. Similar screws 8 are also located adjacent the ends of the grooves. These screws 7 and 8 are designed to limit the movement of balls 9 and 10 which travel within the respective races. A metallic strip 11 is preferably secured upon the bottom of the groove so that the movement of the balls 9 and 10 will not materially wear the races.

Secured upon opposite walls of the housing 1 and directly above and parallel with the tracks 3 are longitudinally extending guides 12 each of which has its inner face grooved longitudinally as shown at 13, while the bottom of each of these guides is also grooved as at 14 to form a race. Screws 15 or similar devices are located at the ends of the groove and a wear plate 16 extends longitudinally within said groove. Interposed between each track 3 and the guide thereabove is an extension slide 17 having a longitudinal groove 18 in the lower edge thereof forming a pair of races 19 and 20 which are spaced apart by means of screws 21 or similar devices. Screws 22 or similar stop devices are also located within the end portions of groove 18 and a wear plate 23 extends throughout the length of said groove. The race 19 is designed to receive the ball 9 heretofore referred to, while the ball 10 projects into the race 20. A race or groove 24 is formed in the rear portion of the upper edge of the extension 17 and has a wear plate 25 therein, while stop devices 26 such as screws are located adjacent the ends of the groove and are designed to limit the movement fo a ball 27 which projects into the race 14 in the guide 12. The front portion of the extension slide is reduced and formed within the upper edge of this reduced portion and in advance of the groove 18 is the groove 28 constituting a race for a ball 29. This groove has a metal wear plate 30 therein and stop devices 31 similar to those heretofore referred to are located adjacent the ends of the groove.

Interposed between the tracks 3, extension slide 17, and guides 12 is a drawer 32 designed to contact with the rounded faces of the track so as to be held thereby out of contact with the extension slide and the guides. This drawer is provided upon its sides with auxiliary slides 33 designed to travel between the reduced portions of slides 17 and the guides 12. Each of these auxiliary slides has a longitudinal groove 34 in its lower face constituting a race into which the ball 29 projects. A metal wear plate 35 is preferably secured within the groove 34 and stop devices, such as screws 36, are disposed within the end portions of the grooves. Anti-friction rollers 37 are mounted upon the sides of the drawer and are designed to travel within the grooves 13 and guides 12.

It will be apparent that when the parts are constructed and arranged in the manner described the drawer when pushed inward will first travel upon balls 29 until the same are brought into contact with the rear stops 31 whereupon the extension slides 17 will be pushed backward and will travel on the balls 9 and 10 until these balls are stopped by the grooves within the races 5 and 6. When the drawer is extended the extension strips are prevented from binding upon the guides 12 because of the balls 27 which are interposed therebetween. Heretofore in the construction of drawers having extension slides considerable difficulty has been experienced in opening or closing the drawers because of the excessive friction between the extension slides and the top guides 12. By interposing the balls in the manner shown and described this objectionable feature is overcome. The friction rollers 37 serve to prevent the drawer from tilting in relation to the extension strips when the auxiliary slides 33 are withdrawn from under the guides 12.

It will be noted that the stops provided in the various races are disposed with their ends flush with the faces of the slides or guides to which they are connected or else retracted within the races. They will not therefore interfere with the movement of the drawer should any of the balls become accidentally displaced. Although each of the races has been shown provided with a wear plate it is to be understood that these plates may be dispensed with, if preferred. The anti-friction mechanism herein described can be used in connetion with drawers of different forms but can also be used in connection with slides, shelves, and other objects designed to be shifted horizontally.

In order that the drawer may be rendered practically noiseless rubber buffers 38 may be arranged upon the outer ends of the extension slides so as to be contacted by the drawer when the same is closed.

An important feature of this invention is the fact that the slides and anti-friction devices hold the drawer centered at all times so that it will not sag when drawn outward. Moreover, the balls by projecting into the races in the slides and guides prevent lateral movement of the drawer so that the same is held at all times out of contact with the side walls of the supporting structure, thus reducing the friction to the minimum.

What is claimed is:

The combination with tracks and guides disposed thereabove, said guides having longitudinal grooves in their adjoining faces, of main slides interposed between the tracks and guides, the forward portion of each slide being reduced, a drawer interposed between the guides and slides, anti-friction devices carried by the drawer and mounted to travel within the grooves in the guides, auxiliary slides secured to the sides of the drawer and bearing upon the reduced portions of the main slides, said auxiliary slides being movable into position between the main slides and guides, the adjoining faces of the guides, slides, and tracks being provided with registering longitudinal races, transversely curved wear plates within the races and extending throughout the lengths thereof, balls seated within the races in the tracks and in the upper portions of the main slides, said balls projecting into the races registering therewith and disposed to prevent relative lateral movement of the slides, tracks, and guides, and stop devices extending through the wear plates and within the races for limiting the movement of the balls, said stop devices constituting securing means for the wear plates.

In testimony that I claim the foregoing as my own, I have hereto affixed my signature in the presence of two witnesses.

GEORGE R. ROSS.

Witnesses:
ALICE BERTRAND,
C. L. CHAMBERLAIN.